United States Patent Office 3,199,189
Patented Aug. 10, 1965

3,199,189

GOLD ALLOY CLADDING

Jerry C. La Plante, Bayside, N.Y., assignor to Alloys Unlimited Inc., Long Island City, N.Y.
No Drawing. Filed Mar. 29, 1962, Ser. No. 183,384
4 Claims. (Cl. 29—488)

This invention relates to means and methods of cladding gold alloys such as Gold Germanium, and Gold Silicon on substrates such as Nickel, Nickel Iron, Kovar, Molybdenum and related materials.

It is difficult to achieve good cladding due to the fact that the gold alloys do not normally form a good bond with the substrate material or even with a gold clad substrate material.

After many unsuccessful experiments, good results were achieved by first leaching the gold alloy to form a porous surface layer of gold. This porous layer then will form a good bond with a gold clad substrate, for instance by hot rolling.

Accordingly, a principal object of the invention is to provide new and improved process for cladding gold alloys on a substrate metal.

Another object of the invention is to provide a new and improved product comprising a gold alloy clad on a metal substrate.

Another object of the invention is to provide new and improved process of cladding gold alloys including the steps of leaching the gold alloys to form a porous gold layer and then bonding said porous layer onto a gold clad substrate material.

Another object of the invention is to provide new and improved process for cladding gold alloys on metals such as Nickel, Nickel Iron, Kovar, Molybdenum and related materials.

Another object of the invention is to provide new and improved process for cladding gold alloys such as Gold Germanium, Gold Silicon and Gold Tin onto substrate metals.

These and other objects of the invention will become apparent from the following specification:

The following unsuccessful experiments were made:

*Example 1.*—Alloy the particular gold eutectic directly onto the substrate by "puddling" or melting, using a variety of fluxing and reducing conditions. Due to the large thermal expansion difference between the gold eutectics and the susbtrate materials, no adequate bond was created with a resulting cracking and peeling at the interface.

*Example 2.*—A thin alloy gold cladding was put on the substrate and then the Au alloy was alloyed directly onto the clad surface. This, too, proved unsuccessful for the same reasons.

*Example 3.*—I attempted pressure bonding directly on the substrate. Results again were unsuccessful.

*Example 4.*—Pressure bonding plus heat were employed directly on the substrate. This, too, proved unsuccessful.

*Example 5.*—Pressure bonding plus heat on the thin gold clad substrate was attempted. Results again were similar.

It became obvious that a bond must be made at a temperature low enough to prevent peeling due to expansion difference. This would entail solid state bonding. Conventional techniques of pressure bonding to the base metal were unsuccessful. Further work with pressure bonding (plus heat) unto pure Au preclad material was only partially successful.

It became apparent that bonding was being prevented by the existence of Si, Ge or Sn rich eutectic phase—present on the eutectic alloy surface.

This was eliminated by leaching of the alloy materials to leach out the Si, Ge or Sn rich phase from the metal surface by immersion in a proper leaching solution for an appropriate length of time. For example, if the Au/Si alloy is leached for six hours in concentrated HF the surface is depleted of the Au/Si phase to a depth of approximately .001 inch. This produces a pure gold surface which is readily bonded by standard heat and/or pressure techniques to a Au preclad base material.

The general successful process is as follows:

*Example 6.*—The gold alloy is leached for six hours in concentrated hydrofluoric acid to deplete the surface of the second material in the alloy, namely, Germanium, Silicon or Tin, to a depth of approximately 1/10th of a mil, thereby providing a gold rich, probably porous, layer. The alloy sheet is then bonded to a gold clad substrate by hot rolling, at a temperature below the melting point of the alloy.

In one specific embodiment it was desired to clad Gold Silicon on Kovar having a gold layer on the other side of the Kovar. The gold layer on the other side of the Kovar is not necessary to the present process. The following steps were taken:

(1) Take a sheet of gold foil .070″ thick having convenient dimensions for instance 3″ x 6″.

(2) An ingot of substrate Kovar approximately ¼″ thick having equal dimensions.

(3) A sheet of gold foil .005–.001″ thick having equal dimensions.

(4) Sandwich the Kovar between the gold sheets and weld around the edges with a heliarc torch.

(5) Heat the assembly to approximately 1300° F. in a reducing atmosphere, for instance of hydrogen.

(6) Roll out the assembly in a rolling mill to approximately .075″ thick. The thickness is reduced approximately 25% per pass in the rolling mill.

(7) Anneal at a temperature of 1300–1400 F. for approximately 1 hour.

(8) Cool in a reducing atmosphere.

(9) To apply the Gold Silicon take a sheet of Gold Silicon foil approximately .015″ thick of the same size as the rolled out assembly.

(10) Leach the Gold Silicon foil in hydrofluoric acid or equivalent for approximately six hours. This may be at room temperature as the temperature is not critical. The leaching process removes the Silicon along the surface leaving a porous surface layer of gold.

(11) The leached Gold Silicon foil is then placed on the thin gold clad side of the Kovar of the three-layer assembly. This four-layer assembly is then rolled at approximately 500° F. down to approximately .009″. The porous surface of gold on the alloy forms a good bond with the gold clad Kovar.

In the above example it was desired to sandwich the Kovar between the alloy and a second layer of gold. If the second gold layer is not desired it may be merely eliminated from the process. It does not affect the bonding of the alloy.

The same process may be used to bond Gold Germanium and Gold Tin to Nickel, Nickel Iron, Molybdenum and related materials.

Many modifications may be made by those who desire to practice the invention without departing from the scope thereof which is defined by the following claims:

I claim:

1. The process of cladding gold alloys of the group including gold germanium, and gold silicon on a metal substrate comprising the steps of;

cladding the substrate on one side with gold foil, leaching the gold alloy for a period of six hours in hydrofluoric acid to provide a porous gold rich surface layer thereon, placing the leached gold alloy in contact with said gold clad on said substrate, and hot rolling said gold alloy and said substrate together at a temperature below the melting temperature of the alloy.

2. The process as in claim 1 wherein the gold alloy is Gold Silicon.

3. The process as in claim 1 wherein the alloy is Gold Germanium.

4. The process as in claim 1 wherein the alloy is Gold Tin.

References Cited by the Examiner

UNITED STATES PATENTS

| | | | |
|---|---|---|---|
| 1,991,496 | 2/35 | Derby | 29—47.3 |
| 2,477,139 | 7/49 | Patton | 29—199 |
| 2,654,146 | 10/53 | Mooradain | 29—199 |
| 2,691,816 | 10/54 | Siegel | 29—199 |
| 2,820,751 | 1/58 | Saller | 29—471.3 |
| 2,897,584 | 8/59 | Schumpelt | 29—199 |
| 3,031,747 | 5/62 | Green | 29—199 |
| 3,075,892 | 1/63 | John | 148—187 |

DAVID L. RECK, *Primary Examiner.*

ROGER L. CAMPBELL, HYLAND BIZOT, *Examiners.*